(12) United States Patent
Bourqui et al.

(10) Patent No.: US 8,689,427 B2
(45) Date of Patent: Apr. 8, 2014

(54) STATOR OF AN ELECTRIC MOTOR

(75) Inventors: Yvan Bourqui, Corminboeuf (CH); Miha Furlan, Bern (CH); Michael Watzek, Courgevaux (CH); David Zimmermann, Corminboeuf (CH)

(73) Assignee: Johnson Electric S.A., La Chaux-de-Fonds (CH)

( * ) Notice: Subject to any disclaimer, the term of this patent is extended or adjusted under 35 U.S.C. 154(b) by 440 days.

(21) Appl. No.: 12/986,603

(22) Filed: Jan. 7, 2011

(65) Prior Publication Data

US 2011/0169367 A1 Jul. 14, 2011

(30) Foreign Application Priority Data

Jan. 8, 2010 (CN) .......................... 2010 1 0002570

(51) Int. Cl.
*H02K 1/18* (2006.01)

(52) U.S. Cl.
USPC ................ 29/596; 310/216.074; 310/216.079

(58) Field of Classification Search
USPC ............. 310/89, 216.003, 216.074, 216.044, 310/216.055, 216.113, 216.079; 29/592, 29/596–598, 609, 732, 744
See application file for complete search history.

(56) References Cited

U.S. PATENT DOCUMENTS

| | | | |
|---|---|---|---|
| 6,476,533 B2 * | 11/2002 | Akutsu et al. .......... | 310/216.003 |
| 6,737,785 B2 | 5/2004 | De Luca et al. | |
| 7,030,525 B2 | 4/2006 | Fujishima et al. | |
| 7,111,380 B2 * | 9/2006 | Sheeran et al. ................. | 29/596 |
| 7,164,218 B2 * | 1/2007 | Kimura et al. ......... | 310/216.044 |
| 7,511,399 B2 * | 3/2009 | Lung et al. ............. | 310/216.055 |
| 7,719,157 B2 * | 5/2010 | Yukitake ................ | 310/216.049 |
| 2004/0124731 A1 * | 7/2004 | Kimura et al. ................ | 310/216 |
| 2005/0115055 A1 * | 6/2005 | Kimura et al. .................. | 29/596 |
| 2005/0200227 A1 * | 9/2005 | Fujishima et al. ............ | 310/218 |
| 2007/0159022 A1 * | 7/2007 | Lung et al. .................... | 310/217 |

FOREIGN PATENT DOCUMENTS

| | | |
|---|---|---|
| JP | 11032454 A | 2/1999 |
| JP | 2005039992 A | 2/2005 |
| JP | 2005261085 A | 9/2005 |
| JP | 2007043832 A | 2/2007 |
| JP | 2007259581 A | 10/2007 |
| JP | 2008199785 A | 8/2008 |

* cited by examiner

*Primary Examiner* — Tran Nguyen
(74) *Attorney, Agent, or Firm* — Muncy, Geissler, Olds & Lowe, P.C.

(57) ABSTRACT

A stator for an electric motor has a stator core, a winding and a housing enclosing the stator core and winding. The stator core has a yoke and a plurality of poles extending inwardly from the yoke. The winding formed by coils wound about the poles of the stator core. The housing grips the stator core and has at least one inwardly deformed portion that retains the stator core in the housing and prevents rotational movement of the stator core relative to the housing. A method of producing the stator is also disclosed.

9 Claims, 3 Drawing Sheets

U.S. Patent  Apr. 8, 2014  Sheet 1 of 3  US 8,689,427 B2

US 8,689,427 B2

STATOR OF AN ELECTRIC MOTOR

CROSS REFERENCE TO RELATED APPLICATIONS

This non-provisional patent application claims priority under 35 U.S.C. §119(a) from Patent Application No. 201010002570.6 filed in The People's Republic of China on Jan. 8, 2010.

FIELD OF THE INVENTION

The present invention relates to a stator of an electric motor and to a method for manufacturing the same.

BACKGROUND OF THE INVENTION

Stators of conventional motors which have an inner rotor and a wound outer stator, are typically made of single piece iron laminations stacked along the axial direction of the motor. Such constructions have a low number of pieces and high stator stability. However, winding of coils on a stator core made of single-piece laminations is difficult and time-consuming due to the narrow opening remaining between the inner ends of adjacent teeth or poles of the stator core. Furthermore, the limited possibilities for wire guidance does not allow optimization of the copper fill factor. The copper fill factor relates to the percentage of the area for the windings within the stator core which is actually occupied by the windings. Generally, a higher fill factor, means better motor performance. However, free space is required for the winding machine. The less free space there is the more difficult and time consuming the winding process.

Segmented stators have been used to overcome the above problems. In segmented stators, the coils are wound on individual stator segments prior to assembling them together to form the stator core. However, besides the task of handling a larger number of stator segments, one problem with segmented stators is how to combine the segments together and to fix the segments to the housing of the stator.

The present invention aims to solve the above problem.

SUMMARY OF THE INVENTION

Accordingly, in one aspect thereof, the present invention provides a method of manufacturing a stator of an electric motor, comprising: providing a stator core comprising a yoke and a plurality of inwardly extending poles; forming a stator winding by winding coils about the poles; placing the stator core within a housing that has a cross sectional area defined by an inner circumferential surface of the housing surrounding the yoke, slightly greater than the cross sectional area of the stator core defined by the yoke; and deforming portions of the housing to reduce the cross sectional area of the housing to cause the housing to grip the stator core to prevent rotational movement of the stator core relative to the housing.

Preferably, the method further comprises: providing a plurality of spaces between the housing and the yoke when placing the stator core within the housing, and deforming the portions of the housing to at least partly fill the spaces.

Preferably, the method further comprises: forming a plurality of axially extending recesses in an outer surface of the yoke to create the spaces; deforming the portions of the housing by radially pressing the housing to form inwardly extending projections; and engaging the projections with the recesses.

Preferably, the method further comprises: forming the stator core from a plurality of individual stator segments, each segment having a rim forming a part of the yoke and a pole forming one of the poles of the stator; placing a dielectric frame on each pole; and winding the respective coil about the pole over the dielectric frame.

Preferably, the method further comprises: forming each individual stator segment by stamping laminations from sheet material, each lamination having a rim section and a pole section, and stacking and fixing together a predetermined number of laminations, the rim sections of the stacked laminations forming the rim and the poles sections of the stacked laminations forming the pole of the stator segment.

Preferably, the method further comprises: forming notches in the rim section of at least some of the laminations before the laminations are stacked together, to form the recesses in the yoke.

Alternatively, the method further comprises: forming a flat section in the outer edge of the rim section of at least some of the laminations before the laminations are stacked together to create the spaces between the yoke and the housing.

Preferably, the method further comprises: arranging the segments with coils wound thereon around a mandrel before placing the segments into the housing; deforming the housing; and removing the mandrel after the housing has been deformed.

Preferably, the method further comprises: forming the recesses as continuous axially extending slots and deforming the portions of the housing into ridges that extend radially into the recesses, thereby reducing the cross sectional area of the housing and causing the housing to grip the stator core.

According to a second aspect, the present invention provides a stator of an electric motor, comprising: a stator core comprising a yoke and a plurality of poles extending inwardly from the yoke; a winding formed by coils wound about the poles of the stator core; and a housing enclosing the stator core, wherein the housing grips the stator core and has at least one inwardly deformed portion that retains the stator core in the housing without rotational movement of the stator core relative to the housing.

Preferably, a number of recesses are formed in an outer surface of the yoke, and the at least one deformed portion comprises protrusions extending inwardly from an inner surface of the housing and engaging respective recesses.

Preferably, the stator core comprises a plurality of individual stator segments coupled to each other in a circumferential direction of the stator.

Preferably, each stator segment forms a respective one of the recesses.

Preferably, the recesses are slots, and the protrusions are continuous or discontinuous ridges.

Preferably, each stator segment comprises a plurality of laminations stacked together, each lamination comprises a rim section and a pole section extending inwardly from the rim section, the stacked rim sections forming a rim of the segment, the rims of adjacent segments being arranged to form the yoke of the stator core, and the stacked pole sections of each segment forming one of the poles of the stator core.

Preferably, each rim section has a notch in an outer edge thereof, the notches of each segment cooperatively forming one of the recesses of the yoke.

Preferably, an interlock structure is formed between adjacent ends of adjacent segments.

Preferably, the interlock structure comprises a coupling projection on one end of the rim of one segment and a coupling recess in the adjacent end of the rim of an adjacent segment, the coupling projection engaging with the coupling recess.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
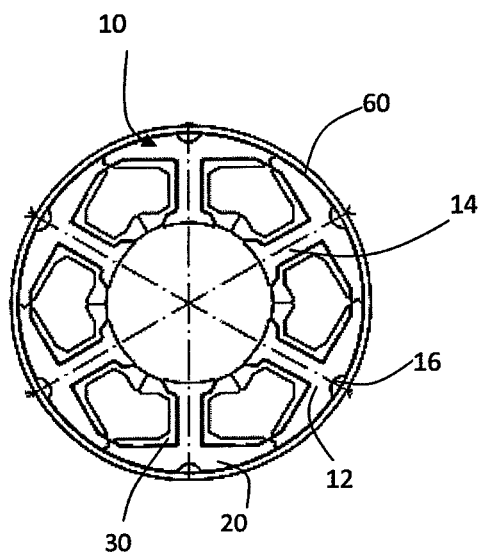
FIG. 1 is a cross sectional view of a stator of an electric motor in accordance with a preferred embodiment of the present invention.
Figure 6:
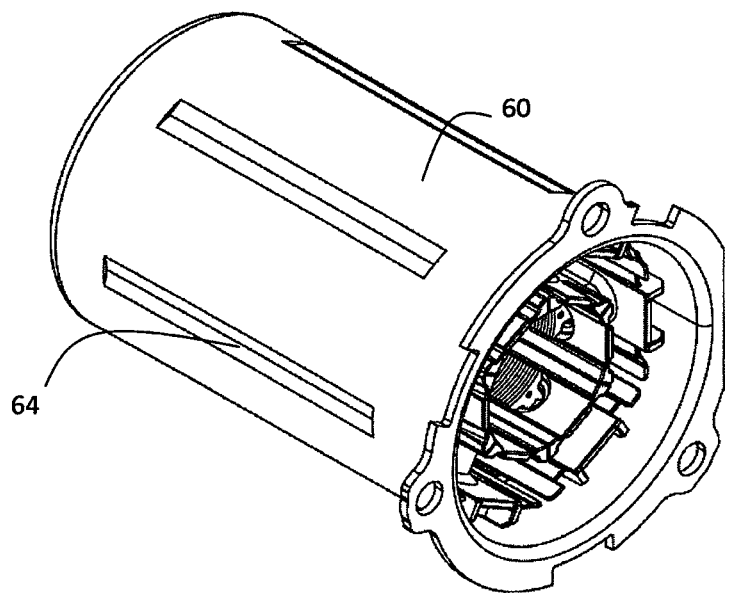
FIG. 6 illustrates an assembled stator.

FIGS. 1 to 6 illustrate a stator for an electric motor in accordance with a first preferred embodiment of the present invention. FIG. 6 shows the completed stator while FIG. 1 shows a schematic plan view of the stator core 10 fitted inside a stator housing 60. The stator windings have been omitted for ease of understanding the construction of the stator. FIGS. 2 to 5 schematically show different stages in the manufacture of the stator.

The stator comprises a stator core 10, a winding 40 wound on the stator core 10, and a housing 60 enclosing the stator core 10 and winding 40. The stator core 10 comprises a cylindrical yoke 12 and a plurality of poles 14 extending inwardly from the yoke 12. The inner ends of the poles 14 are disposed on a common circumference which surrounds a central hole. The central hole is coaxial with the yoke 12. The housing 60 is made of magnetically conductive material, such as soft-magnetic iron, which allows the housing 60 to be a part of the magnetic circuit of the motor.

Figure 2:
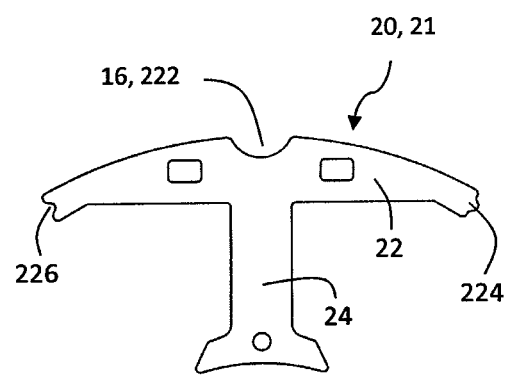
FIG. 2 is a plan view of a segment of the stator of FIG. 1.

The stator core 10 is formed from a plurality of split individual segments 20 coupled in series in the circumferential direction thereof. One segment is shown in FIG. 2. Each segment comprises a stack of a predetermined number of laminations 21, fixed together by known means. Each lamination 21 is stamped from sheet material such as sheet electrical steel, and comprises a rim section 22 and a pole section 24 extending inwardly from the rim section 22. The stacked rim sections 22 from a rim of the segment and the rim of adjacent segments 20 are coupled to each other to form the yoke 12 of the stator core 10. The stacked pole sections 24 of each segment 20 form one of the poles 14 of the stator core 10. In this embodiment, the rim section 22 of the lamination 21 has an arcuate outer edge extending in the circumferential direction of the yoke 12 of the stator core 10, to give the yoke a circular circumference. Each rim section 22 has a notch 222 in the outer edge, aligned with the corresponding pole section 24 in the radial direction of the yoke 12. The notches 222 of the laminations 21, when stacked to form the segment 20, cooperatively form a recess 16 extending axially along the outer surface of the yoke.

A number of corresponding protrusions 18 are formed on the inner surface of the housing 60 and engage with a corresponding recess 16, to thereby prevent the stator core 10 from rotating relative to the housing 60 in the circumferential direction of the housing 60. In this embodiment, the recesses 16 are slots, and the protrusions 18 are ridges. Preferably the protrusions 18 are formed by deforming the housing, in particular, by pressing the housing with tools to form grooves in the side of the housing, as will be described in detail hereinafter. The recesses 16 may be continuous or comprise a plurality of discontinuous sections. The protrusions 18 may be continuous or discontinuous ridges to match the recesses or otherwise. The discontinuous ridges may resemble discrete bumps.

Figure 3:
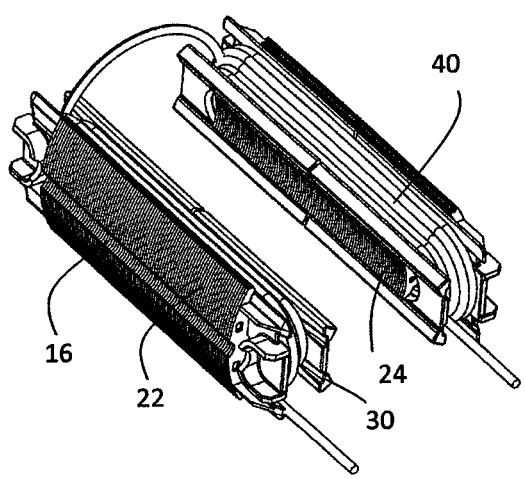
FIG. 3 shows two segments of the stator, insulated and wound, ready to be assembled.

A dielectric frame 30 covers or partially covers the stacked pole sections 24 (poles 14) of each segment to insulate coils of the winding 40 from the stator core 10. Each pole has one coil wound over the dielectric frame. In this embodiment, the stator core 10 comprises six segments and the coils are connected into 3 phases with the two coils of each phase being connected in series as shown in FIG. 3. The two segments of each phase are arranged diametrically opposed. Alternative embodiments with a different number of segments are envisioned and possible.

While the interface between adjacent segments may be a simple flat surface extending in a radial plane, the preferred embodiment has an interlock structure formed between adjacent ends of adjacent segments. Preferably, the interlock structure is a coupling projection 224 provided on one end of the stacked rim section 22 of one segment 20 and a coupling recess 226 formed in the adjacent end of the stacked rim section of the adjacent segment. The projection 224 fits into and engages with the recess 226. As shown in FIG. 2. preferably, each segment has a coupling projection 224 and a coupling recess 226. The interlock structure assists assembly.

Figure 4:
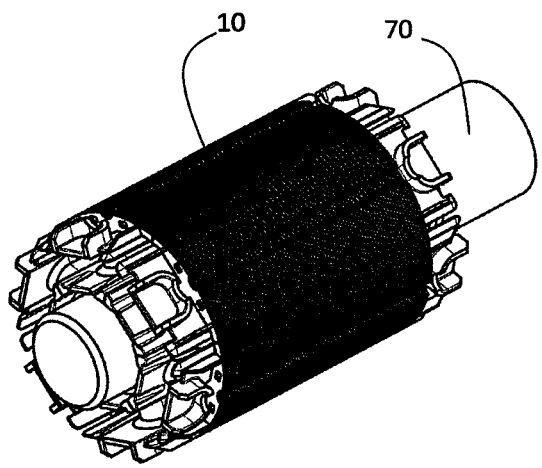
FIG. 4 shows six wound segments placed about a mandrel, ready to be assembled.
Figure 5:
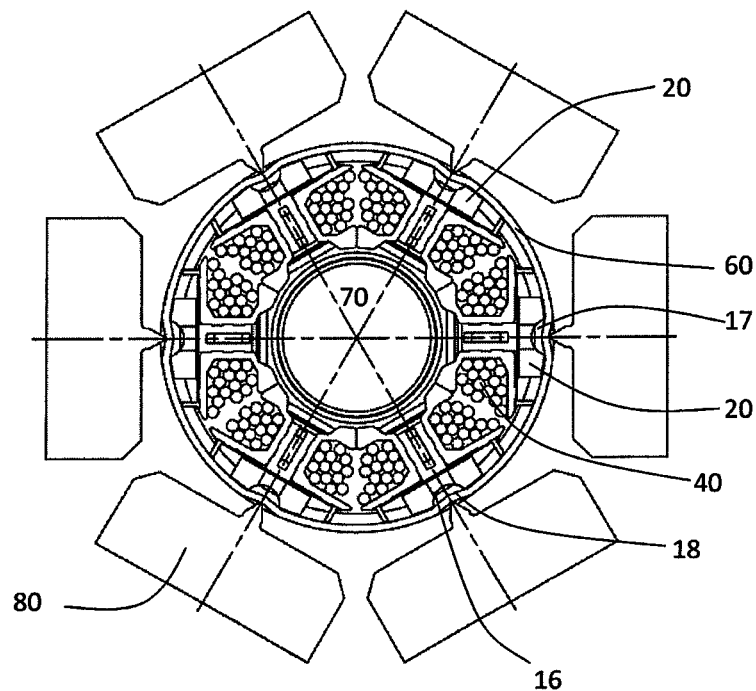
FIG. 5 shows the assembly of FIG. 4 being fixed to a stator housing.

The method of manufacturing the stator comprises the following steps. Providing a plurality of individual stator segments 20, as shown in FIG. 2. Placing a dielectric frame 30 on the pole of each segment 20. Winding coils around the frame 30 on the pole of each segment. Where the coils of a phase are to be connected in series, the coils may be wound in phase lots meaning that the coils of a single phase are wound one after the other such that the coils are formed from a single continuous piece of wire. Once the segments have been wound, they are coupled together or arranged about a mandrel 70 to form a cylindrical stator core 10, as shown in FIG. 4. Preferably, the segments may be fastened to a dedicated support (not shown) to keep the segments on the mandrel and axially aligned with each other. The mandrel and segments are then placed inside a cylindrical housing 60.

The housing has an inside diameter or cross sectional area slightly larger that the outside diameter or the cross sectional area of the stator core so that the stator core is easily placed into the mandrel. The recesses 16 form spaces between the housing and the yoke. The housing is then deformed by radially pressing tools into the housing at locations corresponding to the spaces. This forms grooves in the outer surface of the housing and projections on the inner surface of the housing. The projections 18 extend into the recesses and lock the housing to the stator core to prevent relative rotational movement. The deforming step actually reduces the diameter of the housing causing the housing to grip the yoke of the stator core, thus fixing the stator core to the housing. At the same time the housing now prevents the segments from separating from each other. After the stator is formed, the support and the mandrel 70 are removed.

Understandably, the cross section of the housing 60 is not limited to a circle. The cross section of the housing 60 may be polygonal, for example hexagonal. The yoke of the stator core 10 has a shape substantially matching with the housing 60.

Figure 7:
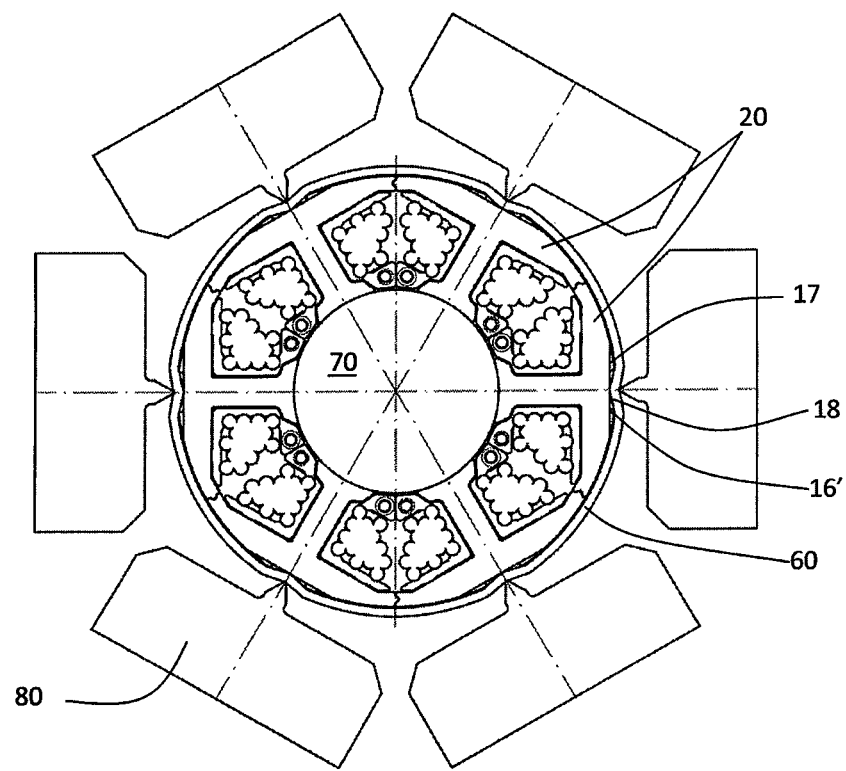
FIG. 7 is a view similar to FIG. 5, of a stator of an electric motor in accordance with an alternative embodiment of the present invention.

In the alternative embodiment shown in FIG. 7, the recesses 16 are replaced by flat sections 16' formed in the otherwise arcuate outer surface of the segments. Before the deforming step, there are spaces 17 between the flat sections 16' of the yoke 12 and the inner circumferential surface of the housing 60. During deformation, portions of the housing 60 facing the spaces 17 are inwardly pressed to at least partly fill the corresponding spaces 17 and the cross sectional area of the housing 60 is reduced, which results in the housing 60 firmly gripping and retaining the stator core 10 therein without rotation movement relative to each other. Preferably, the inwardly deformed portions of the housing 60 become protrusions 18 which partly fill the corresponding spaces 17 and make contact with the corresponding flat sections 16' of the yoke 12. Alternatively, the inwardly deformed portions of the housing 60 may fully fill the corresponding spaces.

Understandably, the method of enclosing a wound stator core by a housing and then inwardly deforming portions of the housing to reduce the cross sectional area of the housing to cause the housing to firmly grip and retain the stator core therein as described above, may also be used to make a stator having a stator core made of single-piece laminations.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A method of manufacturing a stator of an electric motor comprising:
providing a plurality of stator segments separated from each other, each comprising a rim having a cutout formed therein and a pole extending from the rim;
winding a coil of a predetermined number of turns around the pole of each of the separated stator segment;
arranging the plurality of stator segments with the winding coils in series around a mandrel and aligning the rim of the plurality of stator segments to form a cylindrical stator core having a yoke formed from the rim of the plurality of the stator segments and a plurality of poles formed from the poles of the plurality of stator segments;
placing the stator core with the winding coils in a cylindrical housing with a circumferential surface of the cylindrical housing surrounding the yoke of the stator core; and
pressing a plurality of areas of the circumferential surface of the cylindrical housing against the cutouts in the rims of the plurality of stator segments thereby deforming portions of the cylindrical housing to at least partly fill the cutouts and to cause the cylindrical housing to grip the stator core and prevent a rotation of the stator core relative to the cylindrical housing.

2. The method of claim 1, further comprising:
forming an axially extending recess in an outer surface of the rim as the cutout of each stator segment; and
radially pressing the housing to form inwardly extending projections engaging with the recesses on the plurality of stator segments.

3. The method of claim 2, further comprising:
placing a dielectric frame on the pole of each stator segment; and
winding the coil about the pole of each stator segment over the dielectric frame.

4. The method of claim 3, comprising forming each individual stator segment by stamping laminations from sheet material, each lamination having a rim section and a pole section, and stacking and fixing together a predetermined number of laminations, the rim sections of the stacked laminations forming the rim, and the poles sections of the stacked laminations forming the pole of the stator segment.

5. The method of claim 4, comprising forming notches in the rim section of at least some of the laminations before the laminations are stacked together, to form the recesses in the yoke.

6. The method of claim 4, comprising forming a flat section in the outer edge of the rim section of at least some of the laminations before the laminations are stacked together to create the cutouts.

7. The method of claim 3, further comprising: removing the mandrel after the housing has been deformed.

8. The method of claim 4, comprising forming the recesses as continuous axially extending slots and deforming the portions of the housing into ridges that extend radially into the recesses, thereby reducing the cross sectional area of the housing and causing the housing to grip the stator core.

9. The method of claim 1, wherein the winding step comprises connecting a set of the plurality of stator segments by a part of a wire forming the coils wound on the set of stator segments, the set of stator segments being connected only by the part of the wire.

* * * * *